ent.7 9 Claims

ABSTRACT OF THE DISCLOSURE

Partially saponified castor oil surfactants are prepared by reacting an ethoxylated castor oil surfactant with about 0.5 to 3.0 moles, per mole of ethoxylated castor oil, of an alkali metal hydroxide. The reaction is carried out at a temperature ranging from about 75° C. to 100° C., for a period of about 0.5 to 3.0 hours. The products of the present invention are improved surfactants exhibiting excellent detergency; low foaming characteristics; stability in both alkaline and acid solutions; complete water solubility and no cloud point in typical aqueous use solutions.

BACKGROUND OF THE INVENTION

(1) Field of the invention

The present invention relates to the field of nonionic surface active agents. More particularly, the present invention concerns surfactants comprising partially saponified ethoxylated triglycerides of ricinoleic acid, to wit, partially saponified ethoxylated castor oil surfactants.

(2) Prior art

The art and chemistry of surface active agents both anionic and nonionic has developed many products for both general and specialty applications. Usually, these products and especially the nonionic surfactants, can be characterized as having any one of the following physical properties:
(a) no cloud point in aqueous solution;
(b) low foaming characteristics; and
(c) stability in either acid or alkaline solutions.

However, heretofore, no one surfactant has been provided which exhibits all three properties to any degree of efficacy.

SUMMARY OF THE INVENTION

In accordance with the present invention, an improved surfactant composition which exhibits no cloud point in typical aqueous use solutions; low foaming properties; and stability in both acid and alkaline solutions is provided by partially saponifying an ethoxylated castor oil surfactant. More particularly, it has now been found that when an ethoxylated castor oil surfactant containing from 20 to 50 moles of ethylene oxide is partially saponified with from about 0.5 to 3.0 moles, per mole of ethoxylated castor oil, of an alkali metal hydroxide, an improved surfactant is thereby provided.

For a more complete understanding of the present invention, reference is made to the following detailed description and examples thereof.

DESCRIPTION OF THE PREFERRED EMBODIMENT

The surfactant composition of the present invention, as previously noted, consists essentially of a partially saponified ethoxylated castor oil surfactant. The composition is prepared by partially saponifying an ethoxylated castor oil with an alkali metal hydroxide. As used herein and in the appended claims, the terms "castor oil" and "triglyceride of ricinoleic acid" are interchangeable and equivalent.

In the practice of the present invention the castor oil employed can be either naturally occurring or hydrogenated castor oil. Both forms of the castor oil are well known and commercially available.

The intermediate product used in the present invention, an ethoxylated castor oil surfactant, is prepared by ethoxylating castor oil, either naturally occurring or hydrogenated, under oxyalkylation conditions. Ethoxylation of the castor oil is achieved by condensing a prescribed amount of ethylene oxide with the castor oil in the presence of a suitable catalyst. This reaction generally proceeds at a temperature ranging from about 100 to 170° C. and generally at a pressure of from about 10 to 120 p.s.i.

The amount of ethylene oxide reacted with the castor oil to provide the intermediate product is determined by the desired hydrophile-hydrophobe balance in the molecule. In the practice of the present invention, it is desirable to employ a castor oil adduct of ethylene oxide containing from about 20 to 50 moles of ethylene oxide, preferably an adduct having from about 30 to 40 moles of ethylene oxide is employed in the practice of the present invention.

Any suitable oxyalkylation catalyst can be employed in preparing the adduct, such as sodium hydroxide, potassium hydroxide, etc. However, for economic and other practical purposes, it is preferred to employ an alkali compound such as sodium or potassium hydroxide as the oxyalkylation catalyst.

The ethoxylated castor oil surfactant is then partially saponified to provide the surfactant composition of the present invention by reacting it with an alkali metal hydroxide. Partial saponification is achieved by reacting from about 0.5 to 3.0 moles of an alkali metal hydroxide, per mole of ethoxylated castor oil. Preferably, from about 1.0 to 1.5 moles of alkali metal hydroxide per mole of the ethoxylated castor oil, is employed. This reaction proceeds at a temperature ranging from about 75° C. to 100° C., preferably a temperature of 95° C. to 100° C. is utilized.

The alkali metal hydroxides useful in the present invention are selected from the group consisting of sodium hydroxide and potassium hydroxide and preferably, sodium hydroxide.

The reaction proceeds for a period of about 0.5 to 3.0 hours and usually for a period of about 1 to 3 hours, after which time the reaction is at equilibrium and the surfactant has no reverse cloud point.

The resulting products of the present invention, as hereinbefore noted, are only partially saponified. Theoretically, it would appear that the reaction proceeds to saponify the castor oil portion of the molecule, i.e., the alkali metal hydroxide reacts with the triglyceride portion of the ethoxylated castor oil molecule to hydrolyze or saponify it. The results of this is to convert a portion of the molecule into essentially polyoxyethylene ricinoleate alkali soap.

The products prepared in accordance with the present invention are light amber colored liquids which are completely water soluble over a wide temperature range. They are stable in both acids and alkaline solutions; they have low foaming characteristics, and they exhibit no cloud point in typical aqueous use solutions.

Following are specific examples of the present invention which are not to be construed as being unduly limitative of the present invention, but rather illustrative thereof. In all the examples, absent indications to the contrary, all parts and percentages are by weight.

In the examples, Examples I–V set forth specific compositions defined by the present invention. Example VI sets forth foam height determination tests which compare the products of the present invention to those presently available and which most nearly approximate those of the present invention.

EXAMPLE I

To a suitable reaction vessel equipped with steam coils and an agitator was charged 50 parts of an ethoxylated castor oil surfactant. The surfactant was prepared from the addition of 36 moles of ethylene oxide to one mole of castor oil. After the vessel was charged with the surfactant, 49 parts of water and 1 part sodium hydroxide was added thereto. This provided a heterogeneous mixture which was a cloudy white color.

With slow agitation, the heterogenous mixture was heated to 100° C., and maintained at this temperature for about one hour. After this elapsed time, the mixture was a homogeneous pale amber colored liquid with a pH of 8.5. Thereafter, the liquid was cooled to ambient temperature and with slow agitation.

The product had a Draves wetting speed of 40 seconds as measured in a 2% sodium hydroxide solution at 25° C. The Draves wetting speed was determined in accordance with the Draves Sink Test method which is particularly described as The American Association of Textile Chemists and Colorists (AATCC) Tentative Test Method No. 17–52.

EXAMPLE II

The procedure of Example I was repeated using 50 parts of a 20 mole ethylene oxide adduct of castor oil, 48 parts of water and 2 parts of potassium hydroxide.

The resulting product was a pale, amber colored liquid exhibiting a Draves wetting speed of 56 seconds as determined in a 2% sodium hydroxide solution at 25° C.

EXAMPLES III–V

Following the procedure of Example I, a series of products were prepared using varying ethylene oxide mole adducts of castor oil and varying amounts of sodium hydroxide. These products are set forth below in Table I. In each of the preparations 50 parts of ethoxylated castor oil surfactant were employed.

TABLE I

| Example | Base | Moles of ethylene oxide added to base | Amount of NaOH, in parts | Parts of $H_2O$ |
|---|---|---|---|---|
| III | Castor oil | 30 | 1 | 49 |
| IV | do | 36 | 0.4 | 49.6 |
| V | do | 36 | 1.6 | 48.4 |

EXAMPLE VI

To evidence the low foaming properties of the surfactants of the present invention, a comparative foam height determination test was conducted comparing foam heights produced with surfactants of the present invention with products more nearly approaching the products of the present invention and which are described below.

The foam height determination test employed consisted of a manual shaking test wherein 50 ml. of a 1.0% test solution was added to a 100 ml. graduated cylinder maintained at 25° C. The test solution was mixed by inverting the cylinder 20 times and the foam produced thereby was measured in mls.

The products of the present invention which were empolyed herein were those of Examples I, IV, and V. The products employed for comparative purposes were as follows: (1) a 36 mole ethylene oxide adduct of castor oil, referred to as product A hereinafter and, (2) a 36 mole ethylene oxide adduct of castor oil which was attempted to be partially saponified. This product was produced by ethoxylating castor oil in the presence of sodium hydroxide and thereafter, employing the procedure of Example I, the ethoxylated castor oil was warmed, but in the presence of the residual sodium hydroxide employed as the oxyalkylation catalyst. The product hereinafter referred to as product B.

The results of the foam height determination test are set forth below in Table II.

TABLE II

Foam height determination data

| Product: | Foam height, ml. |
|---|---|
| Example IV | 23 |
| Example I | 29 |
| Example V | 32 |
| Product A | 45 |
| Product B | 43 |

It is seen from the above table that the products of the present invention produce lower foam heights than the product which most nearly approximate them.

What is claimed is:

1. A process for the preparation of a partially saponified surfactant comprising the steps of:
   (a) oxyethylating a triglyceride of ricinoleic acid under oxyalkylation conditions to produce an ethoxylated triglyceride of ricinoleic acid, and
   (b) saponifying the ethoxylated triglyceride of ricinoleic acid with from about 0.5 to 3.0 moles per mole of the ethoxylated triglyceride of ricinoleic acid, of an alkali metal hydroxide and at a temperature ranging from about 75° C. to 100° C., to convert a portion of the ricinoleic molecule into essentially polyoxyethylene ricinoleate alkali soap.

2. The process of claim 1 wherein said triglyceride of ricinoleic acid is selected from the group consisting of castor oil and hydrogenated castor oil.

3. The process of claim 2 wherein said triglyceride of ricinoleic acid is castor oil.

4. The process of claim 1 wherein the triglyceride of ricinoleic acid is oxyethylated with from about 20 to 50 moles of ethylene oxide.

5. The process of claim 1 wherein the ethoxylated triglyceride of ricinoleic acid is saponified after a period ranging from about 0.5 to 3.0 hours.

6. The process of claim 1 wherein said alkali metal hydroxide is selected from the group consisting of sodium hydroxide and potassium hydroxide.

7. The process of claim 6 wherein said alkali metal hydroxide is sodium hydroxide.

8. The process of claim 7 wherein said alkali metal hydroxide is potassium hydroxide.

9. The product obtained from the process of claim 1.

References Cited

UNITED STATES PATENTS

| 2,207,257 | 7/1940 | Kapp | 260—410.7 |
| 3,180,836 | 4/1965 | Jurisch | 252—321 |

FOREIGN PATENTS

| 5,466 | 4/1964 | Japan. |

LEWIS GOTTS, Primary Examiner

D. G. RIVERS, Assistant Examiner

U.S. Cl. X.R.

252—321; 260—417